April 28, 1970 S. W. MARSH 3,508,797
BEARINGS

Filed April 30, 1968 2 Sheets-Sheet 1

INVENTOR
SYDNEY WILLIAM MARSH

BY
OSTROLENK, FABER, GERB & SOFFEN
ATTORNEYS

April 28, 1970   S. W. MARSH   3,508,797
BEARINGS

Filed April 30, 1968   2 Sheets-Sheet 2

INVENTOR
SYDNEY WILLIAM MARSH
BY
OSTROLENK, FABER, GERB & SOFFEN
ATTORNEYS

United States Patent Office 3,508,797
Patented Apr. 28, 1970

3,508,797
BEARINGS
Sydney William Marsh, New Malden, Surrey, England, assignor to Solarbridge Engineering Limited, Glasgow, Scotland, a corporation of Scotland
Filed Apr. 30, 1968, Ser. No. 725,427
Claims priority, application Great Britain, May 3, 1967, 20,637/67
Int. Cl. F16c 23/04, 33/20; E01d 19/06
U.S. Cl. 308—3                                5 Claims

ABSTRACT OF THE DISCLOSURE

A bridge bearing having a rubber disc 3 located between a shallow piston 1 and a cylinder 4 wherein the piston floats within the cylinder intermediate an upper sliding plate 2 and the rubber disc 3 such as to minimise the effect of laterally applied loads on the piston 1 and cylinder 4.

---

This invention relates to bearings and particularly to bridge bearings of the kind in which a rubber disc is trapped between a shallow piston and a cylinder. These bearings make use of the ability of rubber to withstand greater stress when constrained than when free and such bearings permit tilting and rotation of the piston.

It has been found that when a considerable lateral force is applied to for instance a bridge structure incorporating such bearings, the load is transmitted from the bridge structure through the piston and cylinder to the column or abutment supporting the structure, and may cause excessive wear on the cylinder walls and piston and scoring of the cylinder walls often occurs when rotation of the piston takes place. Thus, the lateral force imparted to the structure is usually restricted to a small percenage of the vertically-applied load.

An object of the present invention is to provide a bridge bearing having a floating piston.

This is achieved in the present invention by reversing the positions of the piston and cylinder with respect to a sliding member of the bridge structure, whereby instead of locating the cylinder adjacent the sliding member with the rubber disc located between the cylinder and the piston, the piston is located beneath the sliding member intermediate the member and the rubber disc located between the piston and cylinder.

The sliding member is formed with a downwardly depending flange such that any lateral force applied to the structure cannot be transmitted from the piston to the cylinder to effect scoring thereof.

The only force which can be applied to the cylinder from the piston is that caused by the frictional force exerted between a stainless steel facing on the sliding member and a polytetrafluoroethylene (hereinafter referred as PTFE) skin formed on the external surface of the cylinder between the cylinder and the internal surface of the flange of the sliding member. This frictional force may be as low as 2% of the vertically applied force.

Thus, according to the present invention there is provided a bearing of the kind in which a rubber disc is trapped between a shallow piston and a cylinder wherein the piston is arranged to float within the cylinder intermediate a sliding member and the rubber disc thereby minimising the transmission of load between the piston and the cylinder.

With the arrangement described, the piston will always be floating and will take up its own position due to lateral movement through 360° and rotation in any plane through 360°.

Any severe laterally applied loads caused by wind, hunting, acceleration and deceleration are, with the arrangement described, transmitted direct from the bridge structure to the sliding member and thence to the column or abutment supporting the structure via the fixed cylinder or pot, thus considerably reducing the load applied between the piston and cylinder.

Stainless steel is applied to the internal surface of the flange of the upper sliding member opposite the cylinder and to the internal surface of the sliding member opposite the floating piston, and a layer of PTFE is located opposite each of the stainless steel layers such that the sliding member can take up rotation of the bearing and such that the sliding member may move relative to the piston and fixed cylinder when thermal movement of the structure occurs, thereby eliminating excessive restriction particularly when a transverse force is applied simultaneously with the occurrence of the thermal movement.

A preferred constructional embodiment of the inventiton is illustrated in the accompanying drawings wherein.

Figure 1:
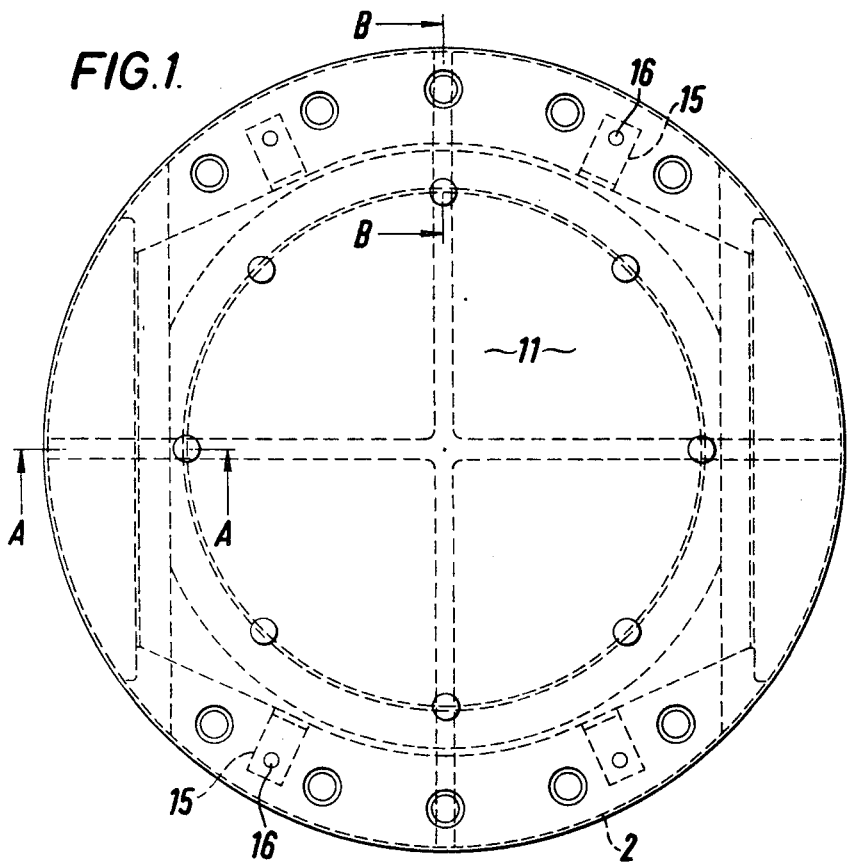
FIGURE 1 is a plan view of a bridge bearing according to the present invention showing the positions of transportation and fixing brackets and bolts.
Figure 2:
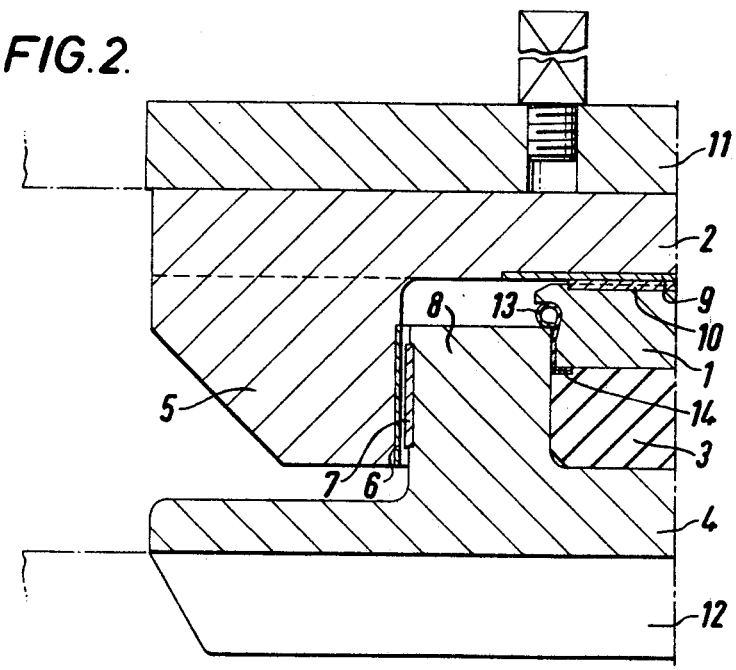
FIGURE 2 is a sectional view taken along the lines A—A of FIGURE 1.
Figure 3:
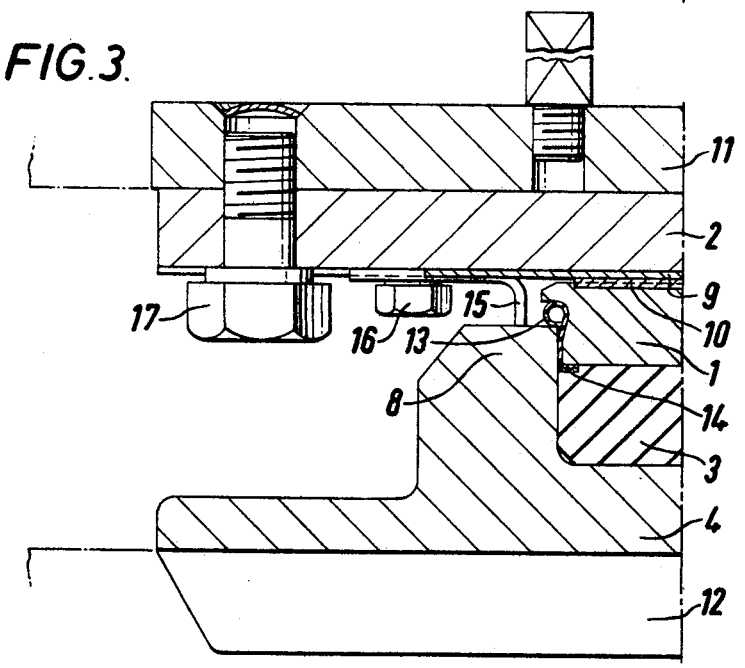
FIGURE 3 is a sectional view taken along the lines B—B of FIGURE 1.

Referring to the drawings a shallow, cylindrical piston 1 is arranged to "float" intermediate a sliding upper member 2 of the bearing and a rubber disc 3. The piston 1 and disc 3 are located within the circular pot or cylinder 4 and the sliding member 2 is provided with a depending flanged portion 5 arranged to extend beyond the piston 1 and having on the internal surface thereof a stainless steel layer 6 located opposite a PTFE layer 7 provided on the external wall of an upstanding rim portion 8 of the cylinder 4. A similar stainless steel layer 9 is provided on the inside surface of the upper portion of the sliding member 2 and is arranged oposite a similar PTFE layer 10 extending across substantially the entire top surface of the piston 1.

As shown, the bearing is located between a steel plate 11 and a supporting web 12. A rubber seal 13 is located intermediate the periphery of the piston 1 and a portion of the upstanding rim portion 8 of the cylinder 4, in order to prevent the ingress of moisture and dirt to the surfaces of the cylinder and piston. Brass bearing rings 14 are inset in the periphery of the rubber disc 3 adjacent the lower surface of the piston 1.

Instead of forming the layer 9 on the undersurface of the sliding member 2, of stainless steel, a layer of duplex material such as metal or fabric like material backed with PTFE may be provided to prevent the spread of the PTFE. Preferably the PTFE is backed with and bonded to mild steel plate in known manner.

As shown in FIGURE 1 the bearing member is provided with brackets 15 formed with slots and arranged to accommodate fixing bolts 16. The transportation and fixing brackets permit the bearing to be transported to the installation site without fear of damage to the relatively movable surfaces of the piston and cylinder and furthermore allow the bearing to be located eccentrically initially to allow for setting, settling and shrinkage of the concrete structure of the bridge or like member, following which the bearing is centralised by adjustment of the bolts within the slots in the brackets 15. Further bolts 17 are provided for bolting the bearing assembly to the steel plate 11 of the bridge or like structure.

With the bearing arrangement of the present invention the bridge structure may be lifted by a small amount to take the load off the bearing, thus allowing the sliding top member to slide back for examination of the remainder of the bearing. This is an important factor in bridge bearing design.

In an alternative embodiment, the advantages specified may be achieved by projecting a leg from the sliding top member, through the floating piston and rubber disc to the fixed cylinder provided that there is sufficient clearance for longitudinal movement of the leg and rotation between the leg, piston, rubber disc and PTFE.

The cylinder wall has a partly balanced load since, apart from the restriction imparted to the transverse force by the modulus of the cylinder section, there is a radial force in the rubber disc brought about by expansion of the rubber in response to the vertical load applied to the disc.

An advantage of the bridge bearing of the present invention compared with that of the prior art is that previously there has been a point contact between the piston and cylinder wall whereas with the arrangement of the present invention, a spreading of the load is effected at the top of the cylinder adjacent the bottom portion of the floating piston.

I claim:
1. A bearing for positioning between two structural members, including:
a cylinder fixedly secured to one of the structural members;
a rubber disc within said cylinder;
a shallow piston extending into said cylinder and having one side pressing against said disc; said piston having a side opposite said one side, which opposite side slidingly engages a sliding member;
a sliding member slidingly engaging said piston opposite side and being fixedly secured to the second structural member;
whereby piston-to-cylinder transmission of the lateral load forces that have been exerted upon the second structural member to the first structural member is avoided due to the sliding contact between said sliding member, which is secured to the second structural member, and said piston opposite side;
said cylinder having an exterior wall;
said sliding member includes a flange depending therefrom, which flange extends into normal continuous engagement with said exterior wall;
said exterior wall and said flange portion in engagement therewith are provided with sliding material permiting relative sliding therebetween;
such that said sliding material permits relative rotation of and permits relative motion between said flange and said cylinder when thermal movement of a structure occurs; yet, lateral forces applied to said sliding member are transmitted through said flange to said cylinder and thereby to the first structural member without causing lateral piston-cylinder load stresses.

2. A bearing as claimed in claim 1, wherein
said cylinder exterior wall has a layer of polytetrafluoroethylene applied thereto on the portion thereof engaging said flange and said flange has a layer of stainless steel applied to its engaging portion.
3. A bearing as claimed in claim 1, wherein
the undersurface of said sliding member is provided with a stainless steel layer arranged opposite a polytetrafluoroethylene layer provided on said opposite side of said piston.
4. A bearing as claimed in claim 1, wherein
the undersurface of said sliding member is provided with a layer of polytetrafluorethylene backed with and bonded to a meal and arranged opposite a layer of polytetrafluoroethylene provided on said opposite surface of said piston, such as to prevent the spread of the polytetrafluoroethylene.
5. A bearing as claimed in claim 8 and provided with transportation and fixing brackets each having a portion in a plane parallel to the planes of the structural members and each being formed with a slot in the said portion, said slots being arranged to accommodate fixing bolts for preventing relative movement of the cylinder, piston and sliding member during transportation, the slots in the brackets allowing the fixing bolts to be arranged such that when the bearing is located between members of a supporting structure, the bearing is located eccentrically initially to allow for setting and shrinkage of the structure and allowing the bearing to be centralised subsequently by adjustment of the positions of the bolts with the slots in the brackets.

References Cited

UNITED STATES PATENTS

| | | | |
|---|---|---|---|
| 3,329,472 | 7/1967 | Donnellan et al. | 308—3 |
| 3,349,418 | 10/1967 | Hein | 308—3 XR |
| 3,397,016 | 8/1968 | Delforce | 308—3 |
| 3,390,854 | 7/1968 | Sherburne | 308—3 |

FOREIGN PATENTS

| | | |
|---|---|---|
| 961,824 | 6/1964 | Great Britain. |
| 991,496 | 5/1965 | Great Britain. |
| 976,069 | 11/1964 | Great Britain. |

OTHER REFERENCES

Esslingen, German application 1,157,640, printed November 21, 1963.

Andra, German application, 1,202,813 printed October 14, 1965.

MARTIN P. SCHWADRON, Primary Examiner

L. L. JOHNSON, Assistant Examiner

U.S. Cl. X.R.
308—238; 14—16